Nov. 19, 1968  J. U. CASBY  3,411,495
BIO-ELECTRICAL SENSOR
Filed Dec. 14, 1965
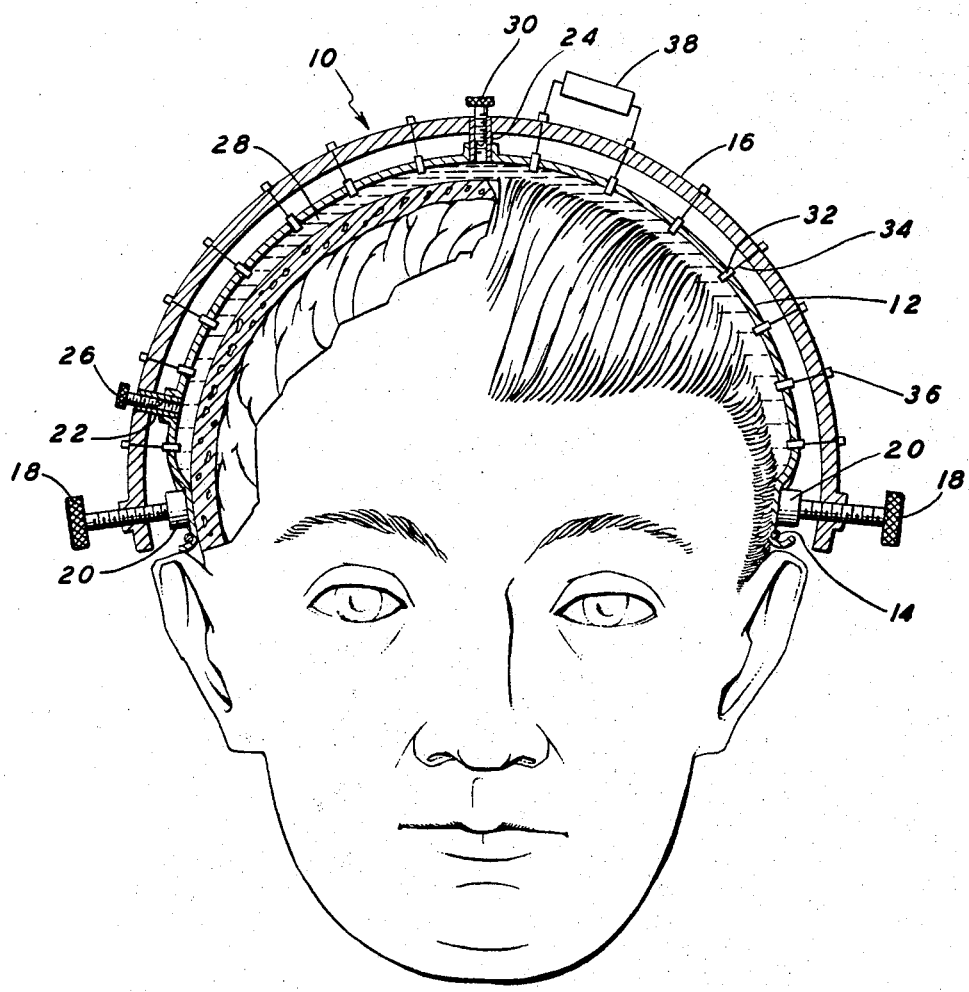
INVENTOR
JAMES U. CASBY
BY Fishman and Van Kirk
ATTORNEYS

United States Patent Office

3,411,495
Patented Nov. 19, 1968

3,411,495
BIO-ELECTRICAL SENSOR
James U. Casby, West Hartford, Conn., assignor to
United Aircraft Corporation, East Hartford, Conn., a
corporation of Delaware
Filed Dec. 14, 1965, Ser. No. 513,725
4 Claims. (Cl. 128—2.1)

ABSTRACT OF THE DISCLOSURE

An electrode assembly primarily useful with an electroencephalograph, the device comprising a plurality of electrodes supported by and extending from a flexible member which is itself supported by a rigid outer member. The assembly also comprises means for injecting an electrolyte into the space between the flexible member and subject and for removing air trapped in said space.

---

The present invention relates to medical instrumentation. More particularly, this invention is directed to sensing minute bio-electrical potentials generated by a subject. Accordingly, the general objects of this invention are to provide new and improved methods and apparatus of such character.

While not limited thereto in its utility, this invention will be described in association with an electroencephalograph. As is well known, the electroencephalograph, hereinafter referred to as the EEG, as well as the electrocardiograph, relies for operation upon the sensing of electrical potentials generated within a subject. In the past, these potentials have been sensed by electrodes positioned against the subject's body.

Standard clinical electrodes presently in use consist of conductive metal plates or discs which are maintained in intimate contact with the subjects anatomy at the point weher a potential is to be measured by elastic straps, adhesive tape or suction cups. It has been found that the use of such standard clinical electrodes, which rely on direct metal-to-skin contact, presents relatively large contact potentials. These contact potentials, which interfere with accurate measurement, are further increased by anything which reduces the intimacy of the contact between the electrode and the skin. Thus, before a standard clinical electrode may be applied, it is necessary that the selected skin area on the subject first be thoroughly cleansed with alcohol or acetone to remove surface oils and easily removable foreign matter.

Another problem inherent in the use of prior art clinical electrodes is precipitated by a large area of the subject's anatomy necessarily covered by the electrode and the means for holding it tightly against the skin. This, of course ,limits the number of electrodes which can be positioned on the subject at any one time. Since, in the case of the EEG, the tester is interested in a pattern of voltages across the skull as sensed by pairs of electrodes, it would be desirable to have available an unlimited number of electrodes from which to choose pairs to be connected to the recording equipment. At the present time, however, using standard metal-to-skin contact electrodes, it is necessary to reposition the individaul electrodes several times in order to obtain a complete voltage pattern. The necessary cleansing mentioned above adds to the otherwise time consuming nature of electrode repositioning.

The present invention comprises a novel electrode assembly which obviates the necessity for metal-to-skin contact and simultaneously provides a large number of electrodes thus overcoming the disadvantages inherent in the use of prior art contact electrodes.

The foregoing and other advantages and objects of this invention will become obvious to those skilled in the art by reference to the accompanying drawing wherein the novel electrode assembly of this invention is indicated generally at 10. This assembly comprises a flexible inner member 12. In the case of the EEG, member 12 is sized and shaped to generally fit the head of a subject as shown. Member 12 will preferably be constructed of a rubberized material and thus may be said to resemble a shower cap. A draw string 14 is provided so as to enable member 12 to be drawn tightly about the subject's head thus providing a substantially fluid tight seal about the periphery of the assembly. Draw string 14 is held in place on member 12 by a plurality of loops, not shown. The seal provided by tightening draw string 14 may be enhanced by a coating of silicone grease applied to the inner surface of member 12, where it will make contact to the subject's anatomy, prior to fitting the assembly on the subject.

A rigid outer member 16 surrounds member 12. Member 16 is perferably constructed of a non-conductive plastic. Member 16 is sufficiently larger in diameter than member 12 so that member 12 may be expanded within member 16. A plurality of set screws 18, only two of which are shown, threadably engage member 16 and pass therethrough. The inner ends of set screws 18 have rubber feet 20 thereon. By adjusting set screws 18, feet 20 may be caused to press member 12 against the subject's head. The force exterted by set screws 18, while not causing patient discomfort, is sufficient to prevent slippage of and thus provides support for the assembly comprised of inner member 12 and outer member 16. Set screws 18 also permit centering of the assembly on the subject's head.

Members 12 and 16 are held together, in part, by flexible conduits 22 and 24. While conduit 22 is preferably located at the back of the neck, in order to facilitate a description of this invention, it has been shown at the side of the head. By removing cap 26, which threadably engages conduit 22, a solution may be pumped into the space between inner member 12 and the subject. Solution 28 should be an electrolytic conductor which is compatible with body tissues. A compatible electrolyte is one which has the same concentration of various cations and anions as body fluid. A "normal saline" solution is a desirable electrolytic conductor for use with the electrode assembly of this invention. Alternatively, "Ringer's Solution" or a commercially available paste such as "Graphogel," manufactured by Tablax Company, New York, may be used. When "normal saline" or "Ringer's Solution" is used as electrolyte 28, a suitable thickening agent may be added thereto if desired to cause a solution to assume a pasty consistancy thereby minimizing leakage about the periphery of the assembly should a good seal be unattainable due to irregularities in shape of the subject's head. Solution 28 will expand inner member 12 until it is approximately 3 millimeters away from the scalp.

Conduit 24 is located at the vertex of the assembly and, upon removal of cap 30 therefrom, permits air trapped within member 12 to be bled off as solution 28 is pumped in. In order to prevent sloshing of solution 28, it is important that there be no air between member 12 and the subject's head.

A plurality of silver-silver chloride electrodes 32 are mounted so as to extend inwardly from the inner surface of member 12. Electrodes 32 are sealed into member 12 during the fabrication thereof in such a manner that the saline solution comes in contact only with the silver chloride portions of the electrodes. Electrodes 32 extend outwardly through member 12 and terminate in the space between members 12 and 16. Leakage of solution 28 around the electrodes cannot occur since the fabrication method insures good sealing. Flexible leads 34 are connected, for example by soldering, to the outer ends of electrodes 32 which extend into the space between members 12 and 16. Leads 34 are brought out through outer member 16 to individual terminal pads 36. Leads 34 are sealed to member 16 where they pass therethrough and thus aid in holding the assembly together.

As previously noted, in measuring "brain waves" potential differences are sensed and recorded. Thus, pairs of leads 34 are employed. Terminal pads corresponding to selected pairs of electrodes may be connected to detachable, solid state EEG signal transmitters such as shown at 38. Transmitters 38 may be mounted, as by suitable clips, on the outside of member 16. Use of microminiaturized transmitters, with proper telemetry equipment, permits freedom of movement of the subject while the EEG signals are being transmitted to the recording and analyzing equipment.

In operation, the electrode assembly is fitted on the subject, caps 26 and 30 removed and saline solution 28 pumped in through conduit 22 while air is bled off through conduit 24. The saline solution effectively increases the diameter of the subject's head so as to envelope electrodes 32. This contrasts with the prior art technique wherein electrodes are pressed against the scalp and the measured voltages thus influenced by contact potentials. Use of this invention permits full and constant electrical contact. It should be noted that the solution 28; since it has the same conductivity as the brain, skull and skin; does not increase the shunting of signals between electrodes. When inner member 12 is completely filled with solution 28, as evidenced by the solution beginning to flow out through conduit 24, caps 26 and 30 are replaced and testing begins. As a result of the large number of leads 34 brought out through member 16, a complete pattern of potential differences across the skull can be made merely by changing the connections to transmitters 38 or leads connected to recording equipment. The changing between selected pairs of electrodes can be accomplished rapidly and without the patient discomfort inherent in the repositioning of metal to skin contact electrodes.

While a preferred embodiment has been shown and described, various modifications and substitutions may be made without departing from the spirit and scope of this invention. Thus, this invention has been described by way of illustration rather than limitation.

What is claimed is:

1. A medical electrode assembly for use in the sensing of bio-electrical potentials from a subject's anatomy comprising:
    a flexible electrode supporting member of suitable size and shape to cover that portion of the subject's anatomy from which potential measurements are to be taken;
    means for sealing said flexible member about its periphery to the subject's skin;
    a plurality of electrodes passing through said flexible member and extending inwardly from the surface thereof toward the subject's skin;
    rigid outer supporting means surrounding at least a portion of said flexible member, said flexible member being supported from said rigid means; and
    means establishing electrical contact between said plurality of electrodes and the exterior of said rigid supporting means.

2. The apparatus of claim 1 further comprising:
    means for injecting an electrically conductive fluid between the subject's skin and said flexible member after the electrode assembly has been positioned on the subject, the conductive fluid enveloping the electrode means and expanding said flexible member away from the subject except where sealed about its periphery whereby said flexible member will assume substantially the shape of said portion of the subject's anatomy.

3. The apparatus of claim 2 further comprising:
    means for removing air trapped between said flexible member and the subject's skin.

4. A medical electrode assembly for use in the sensing of bio-electrical potentials from a subject's anatomy comprising:
    a flexible electrode supporting member of suitable size and shape to cover that portion of the subject's anatomy from which potential measurements are to be taken;
    means for sealing said flexible member about its periphery to the subject's skin;
    a plurality of electrodes passing through said flexible member and extending inwardly therefrom toward the subject's skin;
    a rigid outer member surrounding said flexible member, said flexible member being supported from said rigid member;
    means for removing air trapped between said flexible member and the subject's skin;
    means for injecting an electrically conductive fluid between the subject's skin and said flexible member;
    conduit means passing between the exterior of said rigid member and said means for injecting fluid into and removing air from the space between said flexible member and the subject, said conduit means helping to support said flexible member within said rigid member;
    conductor means extending between said electrodes and the exterior surface of said rigid member, said conductor means having flexible portions; and
    means for supporting said rigid outer member over that portion of the subject's anatomy from which potentials are to be sensed.

References Cited

UNITED STATES PATENTS

| | | | |
|---|---|---|---|
| 603,815 | 5/1898 | Duke | 128—417 XR |
| 2,549,836 | 4/1951 | McIntyre et al. | 128—2.16 |
| 2,590,876 | 4/1952 | Landauer | 128—417 |
| 2,882,904 | 4/1959 | Rasmussen | 128—418 |
| 3,187,745 | 6/1965 | Baum et al. | 128—2.06 |
| 3,295,515 | 1/1967 | Kahn | 128—2.06 |

FOREIGN PATENTS

| | | |
|---|---|---|
| 1,237,702 | 6/1960 | France. |
| 1,360,384 | 3/1964 | France. |

RICHARD A. GAUDET, *Primary Examiner.*

KYLE L. HOWELL, *Assistant Examiner.*